UNITED STATES PATENT OFFICE.

EDUARD MONFANG, OF KIRN, GERMANY, ASSIGNOR TO THE CORPORATION OF NATHAN-INSTITUT A. G., OF ZURICH, SWITZERLAND.

BREWING.

1,286,055.

Specification of Letters Patent.   Patented Nov. 26, 1918.

No Drawing.   Application filed May 11, 1917.   Serial No. 168,039.

*To all whom it may concern:*

Be it known that I, EDUARD MONFANG, of Kirn-on-the-Nahe, Germany, have invented new and useful Improvements in Brewing, of which the following is a specification.

It is known that during the fermentation of beer not only the sugar but also the albumin contained therein undergoes a decomposition, and that the percentage of albumin in the wort is reduced, which reduction is generally considered desirable.

It is also known to employ during the first 24–48 hours at very low temperatures a very small addition of yeast for producing non-alcoholic beers, in which, owing to the omission of the fermentation, both the percentage of albumin and that of sugar in the wort remains essentially unchanged.

The present invention is based on the discovery that the percentage of albumin, as contained in the wort, will not absolutely be detrimental to the beer, but that, on the contrary not only the nutritive value of the beer will rise with a greater percentage of albumin, but also the general flavor of the beer will be improved. Such beers have a fuller taste, foam better and clear more easily.

The means for making such beers consist in carrying through the principal fermentation at very low temperatures varying from 0° to about 6° centigrade, while otherwise such principal fermentation was carried through at temperatures beginning at about 6° centigrade and rising up to about 12° centigrade.

It has been ascertained by a large number of experiments that the two processes, the fermentation of the sugar and the assimilation of the albumin, the relative dependency of which in a certain sense has already previously been investigated, may be controlled by the temperature in such a manner that the fermentation of the sugar may be almost completely carried through, while the assimilation of the albumin by the yeast may be regulated at will, independently of the degree of fermentation of the sugar.

It has been known for a long time that reducing the temperature will, as a rule, retard the process of fermentation. What, however, was not known was that by reducing the temperature at the main fermentation the processes of decomposition, as regards sugar and albumin, will be affected in such a manner that the fermentation of the sugar will, although going on slowly, nevertheless be a complete one, while the assimilation of the albumin is absolutely prevented or, at least, reduced to a much smaller extent than was heretofore customary, or even possible.

Such low temperatures are generally employed for the after-fermentation in the storage vats, but also there the different effect of the temperatures on the decomposition of the sugar and the decomposition or assimilation of the albumin, respectively, was not understood, and for this reason, as also for reason of the entirely different character of the after-fermentation as compared to the main fermentation, no conclusions could be drawn with regard to the main fermentation.

If merely the temperature of the main fermentation is reduced, and the other conditions of the fermentation are left unchanged, the length of time required for the completing of the main fermentation is considerably increased. It has now been found by further experiments, what was heretofore not known with relation to the low temperatures in question, that by increasing the amount of yeast, the time for the fermentation is again considerably shortened, so that the said disadvantage is avoided. The addition of yeast may be increased to an extent which was heretofore unknown even for higher temperatures, and even also impossible owing to the effect on the flavor. The addition of yeast may be increased to a multiple of the maximum amount hitherto employed, *i. e.*, 1 to 1½ liters of yeast to 100 liters of prepared wort, or up to three liters of yeast having a pasty consistence to the hectoliter of wort, without any detrimental consequences being observed.

From the foregoing it is apparent that the rule for carrying out the novel process of main fermentation consists in keeping the temperature as much as possible in the proximity of zero and in simultaneously employing considerably increased additions of yeast. It is important to keep the temperature, which will show a tendency to rise in consequence of the fermentation process itself, as constant as possible by cooling.

In cases where it is desired to obtain, instead of the whole percentage of albumin of the wort, only a part of the same, it will be found preferable to let the first part of the main fermentation proceed at the low temperatures as specified, until say a 10% wort has been reduced to 2-3% Balling, whereupon the fermentation is continued at the usual temperatures.

The process, in general, does not necessitate any change in the mash process nor in the after-fermentation. Of course, it is possible, in dealing with the mash, to consider the suitable composition of the wort, which will control the decomposition and the assimilation of the albumin during the principal fermentation, so as to then prepare for a higher or lower percentage of albumin.

In a similar manner the temperature is controlled in the after fermentation in the storage vat so as not to destroy the albuminoids which enhance the flavor and nutritive value of the beer as above described.

Now what I claim and desire to secure by Letters Patent is the following:

1. The improvement in the art of making alcoholic beer which comprises treating a wort with from two to three parts, by measure, of yeast to one hundred parts of wort and at a temperature in the vicinity of 0° C. whereby a substantial percentage of the sugar in the wort is decomposed while the albuminoids are substantially unaffected.

2. The improvement in the art of making alcoholic beer which comprises treating a wort, during a substantial part of the main fermentation, with from two to three parts, by measure, of yeast to one hundred parts of wort and at a temperature between 0° C. and 6° C. whereby a substantial percentage of the sugar in the wort is decomposed while the albuminoids are substantially unaffected.

That I claim the foregoing as my invention, I have signed my name this 30th day of March, 1917.

Dr. EDUARD MONFANG.

Copies of this patent may be obtained for five cents each, by addressing the "Commissioner of Patents, Washington, D. C."